(12) United States Patent
Blemel

(10) Patent No.: US 6,938,177 B1
(45) Date of Patent: Aug. 30, 2005

(54) MULTI-CHIP MODULE SMART CONTROLLER

(75) Inventor: Kenneth Blemel, Albuquerque, NM (US)

(73) Assignee: Sentient Sensors LLC, Albuquerque, NM (US)

( * ) Notice: Subject to any disclaimer, the term of this patent is extended or adjusted under 35 U.S.C. 154(b) by 673 days.

(21) Appl. No.: 10/028,556

(22) Filed: Dec. 19, 2001

(51) Int. Cl.[7] .......................... G06F 1/04; G06F 13/12; H03K 17/693
(52) U.S. Cl. ..................... 713/500; 710/69; 716/16
(58) Field of Search ............................ 713/500

(56) References Cited

U.S. PATENT DOCUMENTS 5,892,962 A * 4/1999 Cloutier .................... 712/16
6,148,399 A * 11/2000 Lyke ......................... 712/10
2002/0129191 A1 * 9/2002 DaCosta .................... 711/103

* cited by examiner

Primary Examiner—Lynne H. Browne
Assistant Examiner—Stefan Stoynov
(74) Attorney, Agent, or Firm—Sheppard, Mullin, Richter & Hampton LLP

(57) ABSTRACT

A multi-chip module instrument controller having various interface and operational capabilities. The controller incorporate a microprocessor and both volatile and non-volatile memories. The controller includes variable analog-to-digital conversion bit depths, with higher bit depths for some applications. Additionally, the controller includes a separately controllable field programmable gate array that acts as a parallel processor with internal or separate external clock. The FPGA preferably includes more than thirty thousand gates (30,000) and adds a freely re-configurable and separately programmable multi-purpose digital system that can run independent of the microprocessor.

20 Claims, 3 Drawing Sheets

MULTI-CHIP MODULE SMART CONTROLLER

STATEMENT OF GOVERNMENT INTEREST

The terms and conditions of the Cooperative Research and Development Agreement under which tis invention was created entitle the Government of the United States to a non-exclusive royalty free right to practice and use the invention which is the subject of this patent

FIELD OF THE INVENTION

The present invention generally relates to multi-hip modules (MCM). More specifically, the present invention relates to an MCM capable of running multiple is processes and having non-volatile storage for numerous monitoring/controlling applications.

DESCRIPTION OF THE PRIOR ART

U.S. Pat. No. 6,148,399 is directed toward an Advanced Instrument Controller (AIC). The AIC was developed by Mr. James Lyke while employed at the US Air Force Research Laboratory (AFRL). The original purpose of the AIC was to improve over prior art space-based experimental test devices and modules which previously used separate board-mounted payload, control and data acquisition circuit boards that were generally bulky, high power consuming, and expensive.

The design in U.S. Pat. No. 6,148,399 is based on an 8-bit 8051 25 MHz processor which may be clocked at two different frequencies, 12 Mhz and 10 Mhz, by either one of two different internal voltage controlled oscillator circuits for high-frequency and for low frequency operation The internal oscillators provide only relative speed clocking as the clock speed is significantly affected by thermal conditions. The AIC in U.S. Pat. No. 6,148,399 provides 10 bit analog-to-digital (A/D) conversion and 12 bit digital to analog (D/A) conversion for analog output. Moreover, the invention disclosed in U.S. Pat. No. 6,148,339 requires separate power conversion circuitry to provide variable and continuous power levels, even for the low-speed clocks.

The invention in U.S. Pat. No. 6,148,399 combines controller and data acquisition functions of conventional test modules into a single, tightly coupled MCM design. Prior to the invention of the AIC, many MCM design proposals for space-based test devices had been proposed and/or developed; however, designs approaching the functional capability of the AIC would have bee very large and unwieldy because tightly coupled MCMs were unknown in the art.

Tightly coupled MCMs refer to MCMs whose components possess one or more of the following features: (1) more input/output (I/O) terminal contacts than is normally consistent with a discrete implementation, (2) lower capacitive drive in output circuits than is normally consistent with a discrete implementation, (3) I/O terminals in locations inconsistent with standard integrated circuits (ICs), (4) I/O circuitry with reduced or eliminated electrostatic discharge protection structures.

By tightly coupling the MCM more complex interactions between the components within the design are possible, thereby providing greater functional capability than would have been possible using a single integrated circuit In other words, a tightly coupled MCM is built like a hybrid microcircuit but possesses a highly integrated behavior more consistent with "system-on-a-chip" or monolithic IC designs. The result is that Lyke's invention greatly reduced size, weight, and power consumption over discrete implementations ("discrete" referring to an arrangement of several individually packaged ICs built onto a circuit board or other presumably multilayer wiring medium). Accordingly, the invention in U.S. Pat. No. 6,148,399 combines in a small MCM a number of functions which could not have previously been executed using a single integrated circuit.

However, there are several limitations to the design in U.S. Pat. No. 6,148,399. First the AIC is not capable of performing parallel independent processes. Although the AIC does include a specialized ASIC, it is controlled and clocked by the microprocessor and cannot run independently of the microprocessor. Accordingly, independent parallel processes are not possible. Accordingly, what is needed is an MCM design capable of executing multiple parallel processes in an independent fashion.

Additionally, the AIC in U.S. Pat. No. 6,148,399 performs all A/D conversion at a 10 bit digitizing depth and does not offer variable conversion as may be required by different processes. For example, it may be preferred that some processes execute at a higher bit depth of 14 bits while some may be able to execute at a lower bit depth of 10 bits and still ensure accuracy. The AIC of U.S. Pat. No. 6,148,399 uses a constant bit depth of 10 bits for its A/D conversion so all processes are executed at the same bit depth. Accordingly, what is needed is an MCM design capable of performing A/D conversion at different bit depths such that multiple parallel processes which require different bit depths can be executed in an independent fashion.

SUMMARY OF THE INVENTION

The present invention is embodied in a stand-alone, compact low-power electronics instrument controller which utilizes an MCM design. However, an electronics instrument controller designed in accordance with the present invention has less complexity, includes enhanced power management, and offers more functional flexibility than prior art controllers. This is because an electronics instrument controller designed in accordance with the invention includes a significant improvement in functionality and circuitry design over prior art MCM controllers, such as the AIC in U.S. Pat. No. 6,148,399. For example, the present invention improves on the digitizing precision and offers variable A/D conversion bit depths, with higher bit depths for some applications. Additionally, the circuitry design of the present invention eliminates the need for a resistive ASIC. Instead, the present invention adds a separately controllable FPGA that acts as a parallel processor with internal or separate external clock. The FPGA preferably includes more than thirty thousand gates (30,000) and adds a freely re-configurable and separately programmable multi-purpose digital system which can run independent of the microprocessor. Finally, the present invention incorporates a microprocessor with significant processing improvements over the processor used in the AIC patent including an increased processing speed of up to 33 Mhz.

The present invention uniquely combines inherent core and I/O feature, design methodology, and operating principles to create an electronics building block having numerous monitoring/controlling applications. Along with its increased functionality and unique circuit design, the primary characteristics of the present invention are its compact size, light weight, low power consumption, and compatibility with robust application regimes. The core elements of the present invention include a microprocessor, static random access memory (single or multi-ported), non-volatile memory (e.g., flash or EEPROM), a dynamically reconfigurable field programmable gate array (FPGA), reconfigurable interconnect devices, analog function blocks, and embedded power conversion. Preferably, the present invention supports multiple analog inputs (to either 14 bit or 12 bit digitizers), with at least four analog inputs to a high precision (xx bit) digitizer analog outputs (from a digital representation), adjustable analog signal paths (variable gain, offset, impedance, signal filtration properties), serial communications ports, interrupts, and digital discrete I/O.

In a preferred embodiment, the present invention supports the following types of functionality: (1) in-situ reprogramming of the microprocessor's operational software (program code); (2) in-situ reprogrammation of the FPGA's operational software programs with adaptive parallel program codes, (3) individualization of the serial codes, embedded descriptions of design specification, past history, maintenance, etc.; (4) storage of configuration information for setting properties of functional units; (5) a real-time crystal oscillator controlled clock and (6) creative power management options for discontinuous (going from powered operation to non-powered) operation effected through state preservation and recovery.

DETAILED DESCRIPTION OF PREFERRED EMBODIMENTS

The present invention is embodiment in a tightly coupled smart control system which uses a multi-chip module (MCM) instrument controller which uniquely combines conventional high-density interconnects patterned in an overlay of MCM substrates.

Preferably, the MCM of the present invention is capable of receiving multiple analog input and offers variable A/D conversion, including at least four high speed precision differential digitizers for enhanced performance. Additionally, the present invention incorporates a stand alone FPGA based parallel processor which can be configured to run under control of a microprocessor or independently. The invention embodies many additional features that make it possible in some cases to use no additional pre-scaling, timing, and other supplemental electronics. As such, the invention is similar to a "system-on-a-chip" and appears similar to a chip in size, weight and physical configuration, but through a tightly coupled MCM implementation, transcends the functional capability of a single integrated circuit.

Overall Functional Elements and Configuration

In a preferred embodiment the invention combines a microprocessor, a large Field Programmable Gate Array (FPGA), high speed precision A/D converters, D/A converters for producing analog outputs, and both volatile and non-volatile memory storage systems. Preferably, the invention includes an embedded smart power conversion system.

The invention combines all of these elements on a single tightly coupled MCM to achieve its stand-alone capabilities. These capabilities include ultra-low power requirements, extremely small size and weight, versatile functionality, and the ability to operate in extreme environments.

Figure 1:
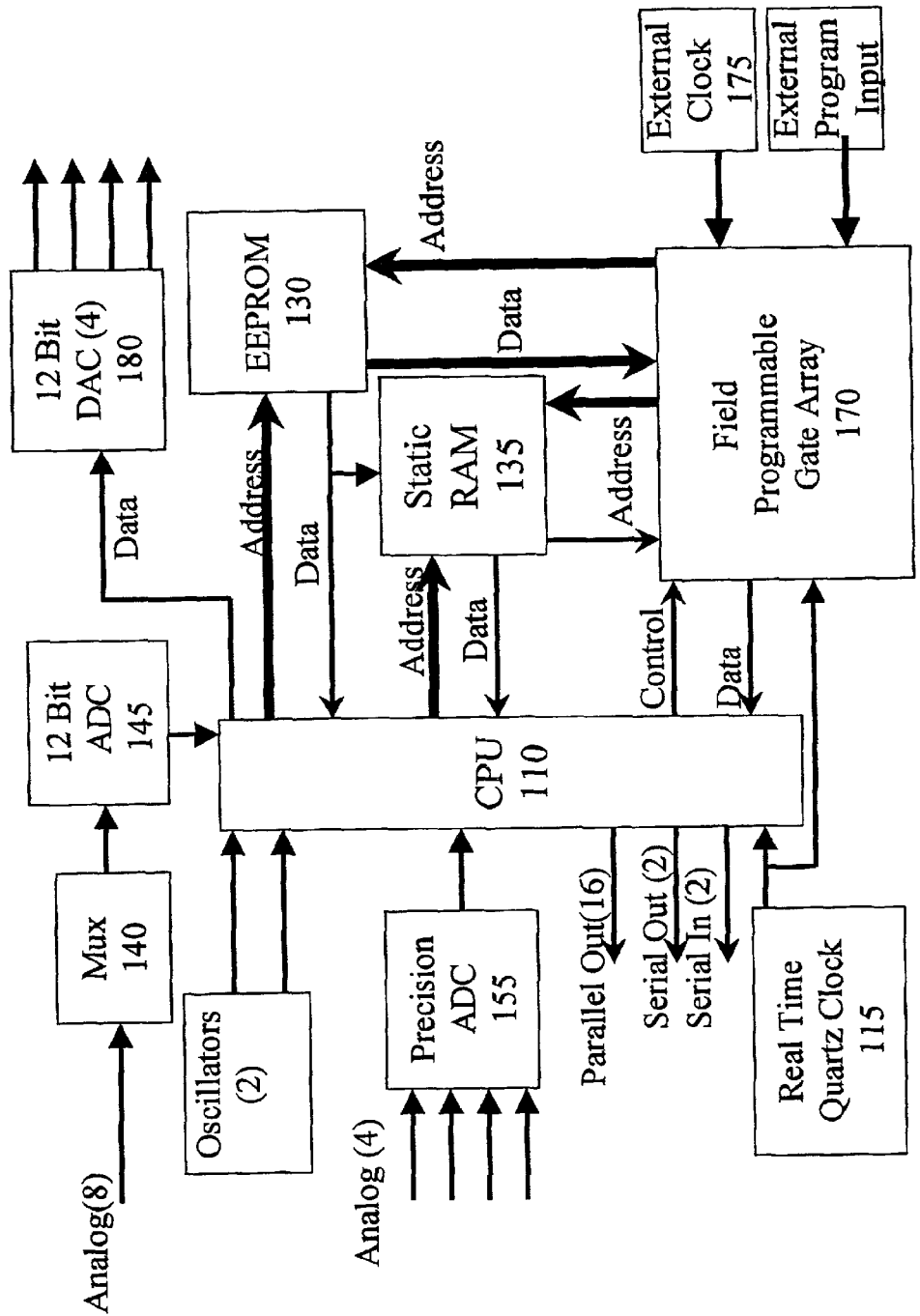
FIG. 1 is a functional schematic block diagram of a preferred embodiment of the MCM Controller of the present invention.

FIG. 1 is a schematic block diagram which illustrates a preferred embodiment of the present invention As shown, the invention is comprised of a microprocessor 110 having a plurality of I/O ports, including analog inputs/outputs and digital serial inputs/outputs. The microprocessor 110 is preferably clocked by a system clock signal SYS CLK which is generated by either an on-module voltage controlled oscillator (VCO) 115 or an external clock 120. In a preferred embodiment the present invention actually includes two different on-module VCOs for generating a high frequency clock signal and a low frequency clock signal. The high frequency clock signal will be used during a high frequency operation mode and the low frequency clock signal will be used during the low frequency operation mode.

The microprocessor is preferably coupled to volatile and non-volatile memory components. In a preferred embodiment the non-volatile data storage component 130 is a large 256 Mbit EEPROM, and the volatile memory component is a large static RAM.

The microprocessor is preferably configured to receive a plurality of analog inputs. As shown in FIG. 1, at least eight analog inputs are received through an eight channel multiplexer 140 and digitized using high resolution A/D converters 145 (equal to or greater than 12 bits). Additionally, the present invention further includes at least four parallel high precision digitizers 150a–d which are capable of receiving analog inputs directly and digitizing these inputs at a higher bit depth (ex. 14 bits) without the need for separate resistors and capacitors for signal conditioning. The high precision digitizers 150a–d are designed and implemented to operate with dual electronic circuit configuration whereby one digitizer provides an alternating period of time to allow for high speed yet stable signal acquisition and digitizing of signals.

The microprocessor is further coupled to a fully programmable field gate array (FPGA) 170. In a preferred embodiment, the FPGA is comprised of at least 30,000 gates which may operate either under control of the microprocessor (for example as a co-processor) or, may be operated independently. The FPGA provides the ability to use internal parallel processing. For example, the FPGA could be performing signal processing while acting as a cross-bar switching device to select analog or digital signals, and performing signal conditioning and filtering at the same time. As shown, the FPGA may be clocked using the same on-board VCO as the microprocessor; or it may be clocked separately via an external clock 175. Alternatively, where no clock is used, the FPGA will operate at gate speeds.

A preferred embodiment of the present invention further includes at least four 12 bit digital-to analog (D/A) converters 180 for providing analog output signals.

Microprocessor

In a preferred embodiment, the microprocessor of the present invention preferably includes an embedded memory that enables the startup of processing without first loading a program from the non-volatile memory. This improves on the prior art systems which can only operate after a program is first loaded from non-volatile memory. Moreover, the improvement provides a totally unpowered ready state, reduces power consumption when idle, and provides an abbreviated time to activation by retaining the active program in non volatile memory thereby eliminating need for loading of the initiating program.

Additionally, because the microprocessor of the present invention has an autonomous startup capability on activation it can operate without need for control of an internal or external clock. This means the present invention can function with discontinuous applied power whereas prior art controllers can only go into a sleep mode that requires power to the internal capacitive oscillating circuit. This means the present invention is able to display history-dependent behavior and be put to zero-power sleep for extended periods of time to be awakened by application of power from another device. This also means the invention can turn itself off completely allowing for wakeup on activation by the next input of power (e.g. from solar energy).

Interfaces

As described earlier herein, the present invention has multiple I/O including a plurality of digital and analog inputs. Additionally, the present invention provides for variable A/D conversion of these analog inputs and different bit depths. In a preferred embodiment the invention includes an internal 10 bit analog-to-digital (A/D) converter with a 12 channel multiplexer front end. In a preferred embodiment at least four of the twelve input channels have differential amplifier inputs. The amplifiers are preferably low power operational amplifiers, which may to be shut down under program control when not in use. In shutdown mode each op amp draws no current. The amplifiers are configured to permit sensors which use the 4–20 milliamp interface convention to be used directly with the present invention without the need for a specialized ASIC for signal conditioning of the input.

In a preferred embodiment the invention also includes multiple (at least four) high precision analog-to-digital (A/D) converters operating in alternating fashion to avoid aliasing of signals. These high precision A/D converts are configured to operate at high speeds, providing significantly more conversions per second. They also provide higher precision (i.e. 14 bits) for advanced applications such as digital signal processing.

The invention further includes a 12 bit precision analog-to-digital (A/D) converter that is serially multiplexed over the an individual or multiple (at least 8) input channels. Each channel preferably has a fixed window for operation corresponding to zero and full sale digital readings, with the inputs defaulting to one of the fixed window values. Accordingly, such a typical default window might be 0–4.096V for input range where a channel receiving a –2V signal would be represented as 0V at the input and a 10V signal would be represented as 4.096V.

In most applications, it is important for a controller to have a large number of serial interfaces. Most conventional controllers have few, if any, serial interfaces and it is often necessary to add additional hardware to allow for more serial interfaces. In a preferred embodiment of the current invention, a large number of serial interface are preferably readily accommodated without the need for additional hardware. Accordingly, in a preferred embodiment the present invention includes a number of both a synchronous serial ports (e.g., RS-232/RS422) as well as synchronous (e.g., clocked) serial ports. Preferably, the voltage levels of the serial ports default to CMOS-compatible levels; however, the present invention includes an adaptive I/O module which allows these voltage levels to be adjusted.

For example, the RS-232 ports could be adjusted to +/–4V instead of (0,3.3V) levels.

In a preferred embodiment, the invention has more than 10 externally available discrete signal channels. These channels are bi-directional lines having pull-up or pull-down characteristics that can be externally set. When used as outputs, these channels are set to CMOS level; however, a subset of the lines can be passed through an adaptive I/O function to adjust the levels to any two other desired voltage levels.

Memory Storage Components

The present invention further includes a combination of large volatile and non-volatile memory storage components. These memory storage components are preferably customized and tightly coupled within the MCM for maximum performance.

In a preferred embodiment the non-volatile memory storage components include at least two non-volatile memory units each with a minimum of 256K bytes of non-volatile memory space, preferably FLASH or EEPROM based. In addition, the invention allows for the coupling and addressing of an external data storage unit such as a FLASH memory card or EEPROM memory. The non-volatile memory is used for both program storage and data storage, which can be changed repetitively, limited only by the fatigue mechanism associated with the non-volatile device. In a preferred embodiment the nonvolatile data storage allows for data time stamping with the digital value of an accurate internal clock. Accordingly, the digital output from the real time date/time clock 165 can be used to provide accurate date time stamping of data. In a preened embodiment the present invention powers down the non-volatile components when power consumption needs to be minimized, so that the effects of non-optimized drivers (those not designed with tightly coupled methodologies) that consume high amounts of power can be negated.

In a preened embodiment the present invention further includes a volatile static random access memory (SRAM) 155 with storage contents comparable to or larger than the address space that the CPU operates upon. Unlike prior art controllers, such as that in U.S. Pat. No. 6,148,399, where some components such as the SRAM are always powered, the present invention is able to totally shut down all electronics to achieve a zero power state. The present invention is able to reinstate activity upon an activating event or upon receipt of an external activation signal. Preferably, the SRAM contains a shadow copy of the program memory.

The present invention preferably utilizes a large static random access memory (SRAM) for the volatile memory. The volatile memory can all be used to store programs and large amounts of data (greater than 2 megabits).

The ability to exploit non-volatile data storage allows the present invention to preserve he context of key operations by periodically storing state information and intermediate results from algorithms executed by the microprocessor and/or the FPGA. The existence of this state information is tested upon reset especially after power is interrupted, to determine where the last left operation (a simple form of rollback). The non-volatile storage also allows serialization, for specific calibration parameter storage (e.g., monitor the non-linearity of its own analog inputs and store the necessary corrective coefficients in memory), and for history-depending operations such as data logging. It is possible to also store particular design specifications, usage/maintenance history for recall during diagnosis, maintenance, and repair of the present invention. The non-volatile memory of the present invention may also be used to program reconfigurable logic (e g. the FPGA) and interconnect devices.

Internal Clocking

In a preferred embodiment the present invention includes at least three internal oscillators 115$a$, 115$b$, and 115$c$, and one real time quartz clock. Two of the oscillators are used to produce internal clock signals which clock the microprocessor. In a preferred embodiment one oscillator generates a high-frequency clock signal which is used to clock the microprocessor for high frequency operations. The other oscillator generates a low-frequency clock signal for low-frequency operations, respectively. The distinction between the high-frequency and low-frequency oscillators is important as it is necessary for power preservation to maintain an independent oscillator that operates at a lower frequency. The third oscillator generates a clock signal which is used for the individually programmable FPGA. In order to offer accurate speed and performance at high-G applications or applications where both extreme cold and discontinuous operation are present, the present invention preferably utilizes non-crystal based oscillators for effective operation. Alternatively, cryst oscillators may be used. The present invention also permits external oscillators for cases where synchronization or more precise timing is important. In all cases, the low frequency clock signal is independently generated to minimize power consumption in divider networks and fast-switching drivers. In a preferred embodiment, the high-frequency oscillator operates at 25 MHz and the low-frequency oscillator operates at 200 Hz for high and low frequency operations, respectively. The third oscillator is preferably a 33 MHz oscillator which is used to control the FPGA (which otherwise would operate at the speed required to complete gate transitions). Alternatively, the FPGA may be clocked from an external clock signal. In this embodiment, only two oscillators are necessary.

In a preferred embodiment, the present invention further includes a resettable digital real time quartz controlled clock for precision to. The resettable digital real time quartz controlled clock provides for accurate date and time stamping of recorded data.

Field Programmable Gate Array

The design of the present invention eliminates the need for an analog application-specific intended circuit (ASIC). Instead, present invention utilizes an independently operable and programmable FPGA which is used to implement many of the key instrumentation functions of an ASIC. In a preferred embodiment, the FPGA is a large (greater than 30,000 gate) Field Programmable Gate Array which operates either under control of the microprocessor (for example as a co-processor) or, can be operated independently. The FPGA provides the ability to use internal parallel processing. For example, the FPGA could be performing signal processing while acting as a cross-bar switching device to select analog or digital signals, and performing signal conditioning and filtering at the same time. This can be extended to re-route almost all external conductors and selected internal conductors, whether power or signal bearing. The FPGA can be switched off to consume no power during sleep and restarted by the external signal or by the processor program when the processor is reactivated.

The combination of the FPGA and microprocessor provides built in test capability not inherent in prior art control systems, which utilize a single microprocessor and specialized ASIC. More specifically, the FPGA can be programmed to monitor the functionality of the microprocessor, the analog-to-digital conversion operations, and the digital-to-analog conversion operations. Alternatively, the microprocessor can be used to perform built in self test on the FPGA.

The invention provides for either external or internal input of a clock signal from a high speed oscillator for controlled sequencing of multiple processors formed in the FPGA for parallel processing. Otherwise, if no clock signal is provided, then the FPGA operates at gate ripple speed. By operating the FGA at higher speeds, the present invention improves on the speed of operations and digital calculations and enables the FPGA to act as a mathematical co-processor.

The FPGA utilized in a preferred embodiment of the present invention has the ability to be reprogrammed from non-volatile memory, by the microcontroller, or through a serial port. This enables the parallel activities of the FPGA to be constructed "on the fly" and personalized with a variety of unique programs and data, such as serial codes, calibration coefficients, or a reduced "traveler" containing process history. Accordingly, the FPGA of the present invention has the ability to be dynamically configured as a processor with extended mathematical or logical precision (e.g. 32 bit or 64 bit).

Figure 2:
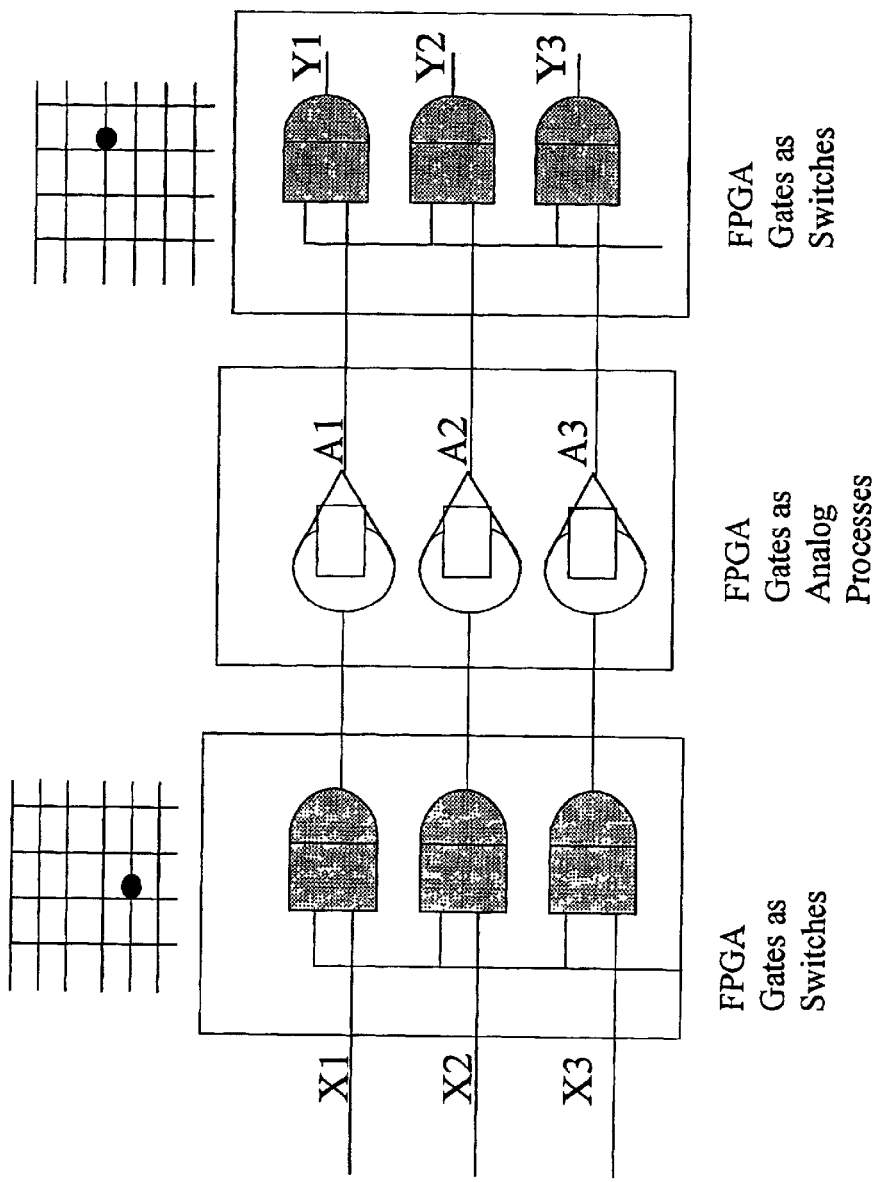
FIG. 2 is a functional block diagram that illustrates the concept of utilizing the FPGA to reroute external inputs and execute multiple processes.

The present invention can use the parallel processing of the FPGA to re-route a subset of its external interconnections through the use of switch matrices. FIG. 2 illustrates the concept of utilizing the FPGA to reroute a subset of the external inputs in order to perform parallel processes. As shown, gates X1, X2 and X3 are configured to route the input at node A to anyone of three independent processes A1–A3. The processes are independent configurations of a subset of gates within the FPGA. Switches Y1, Y2 and Y3 are configured to selectively route the outputs from these processes to the output node B. When the analog functions represented by A1–A3 are identical, then a form of functional redundancy is achieved, giving an increased fault tolerance to the signal monitoring function. When the analog functions A1–A3 differ, then different analog processing functions are selectively applied to the analog signal being monitored.

The parallel processing internal to the FPGA eliminates the unreliability of switches built from discrete or microelectromechanical systems (MEMS) technology. Preferably, the FPGA can be configured in numerous gate array patterns. Additionally, FPGA switching is far superior to prewired solid state switches for near-static reconfiguration of digital and analog signal lines. The FPGA provides lower series resistance, flexibility, lower signal variability, ability to swing above and below rails without attenuation, lower noise, and non-volatility. Using the FPGA, the present invention is endowed with important capabilities, including the re-location of I/O due to wiring errors.

Internal Embedded Power Conversion

As described earlier, a preferred embodiment of the present invention includes an internal embedded power conversion module which greatly extends robustness of the design, particularly when a number of adjustable internal voltage references are provided. When combined with agile analog control, this capability allows the present invention to not only maintain its internally correct operating power supply under external variation, but this capability permits the present invention to maintain interface integrity. This internal embedded power convertor performs two key functions: generation of each operating and reference voltage needed within the module and regulation and filtering of power supply irregularities over a very wide voltage range.

Figure 3:
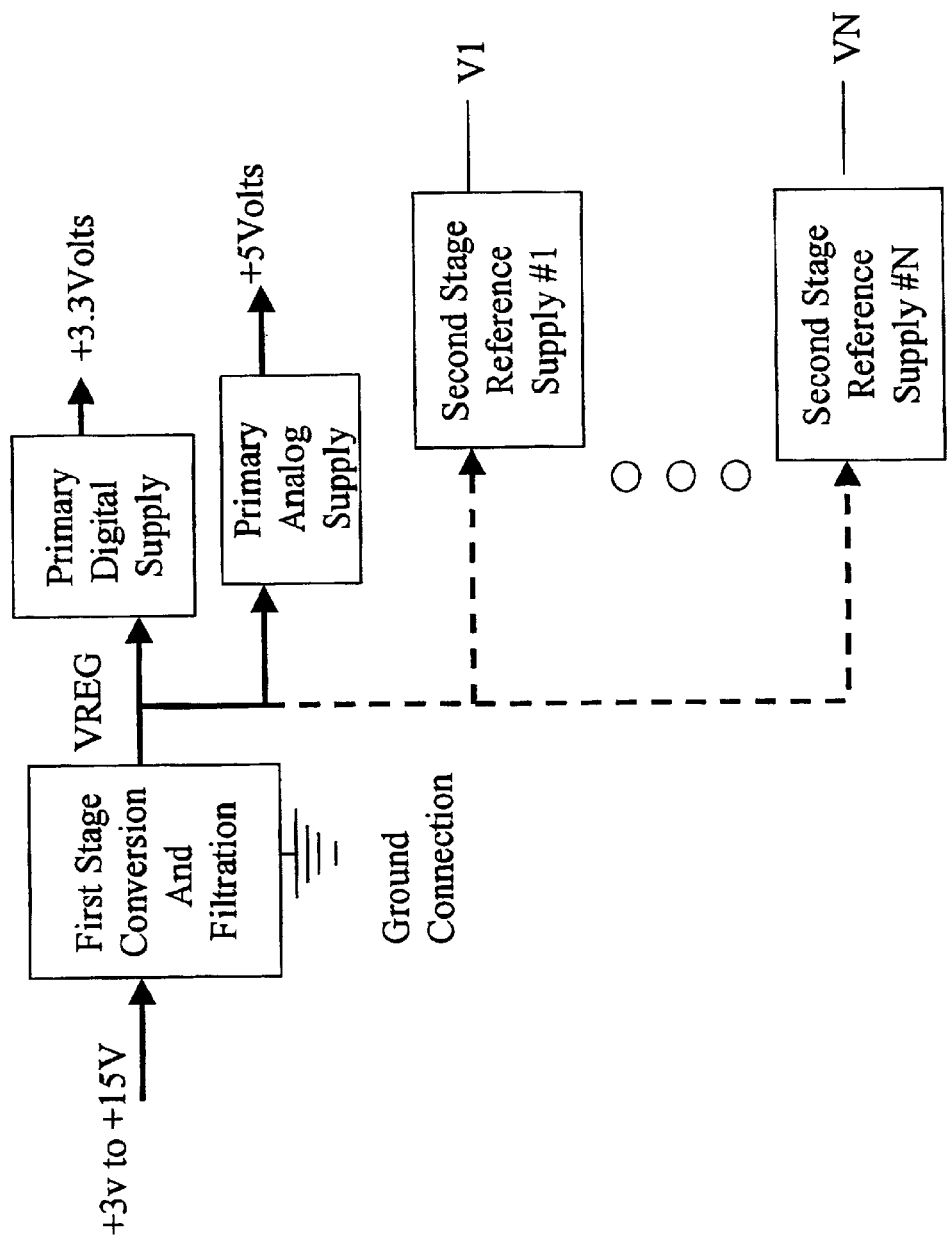
FIG. 3 is a functional block diagram that illustrates the operational concepts for the embedded smart power convertor utilized in a preferred embodiment of the present invention.

In a preferred embodiment subsets of gates in the FPGA can be used to provide power conversion, thereby forming an internal embedded power conversion module without requiring any additional circuitry. FIG. 3 is a functional block diagram which illustrates the internal power conversion concept. As shown in FIG. 3, a first stage in the internal power converter converts an unregulated supply voltage to a fixed, regulated voltage (VREG). A number of second stages convert from the fixed VREG to several power voltages consumed internal to the module. These second stage voltages provide for the supply of internal digital power, internal analog power, and a series of reference voltages. Many topologies known in the art of power convertor design may be applied, whether switching based, linear based, or a combination of the two.

Applications and Functionality

The present invention can be applied and/or used in numerous applications. Such applications include motor controllers, cryocooler refrigerator controllers, distributed health and status monitoring systems, configuration management processors, safety interlock protocol management security systems, miniature weapons computers, space probe central control processor, beacon processor, and jet engine control. The invention may also be used on the manufacturing floor for smart, discontinuous low-level sensing test equipment probes, embedded credit card processors, wearable computers, or remote data logging.

The inclusion of the FPGA in the design of the present invention provides a simultaneous parallel processing capability that can be implemented as a mathematical coprocessor and still perform as a digital signal processor (DSP) of multiple analog signals simultaneously digital by the ADC, all the while switching input lines to the ADC.

The present invention has been designed especially for managing multiple sensors, both discrete and continuous. Because of the fast and high precision ADC included in a preferred embodiment the FPGA can perform vibration signature analysis and harmonic analysis using DSP algorithms. This capability is used in determining the health and condition of transmissions, engines and other rotating equipment. Used in a wired system, the invention is able to perform DSP analysis of the wiring and the items connected to of the wiring. The invention can determine the condition of power signals as well as digital signals and can be used with microlight sources to determine the health of fiber optic carriers.

In a preferred embodiment the present invention can implement a bi-directional scheme for extending the operating voltage range of discrete drivers through a smart-signal concept. For outputs, one of two charge pumps are selected by the CMOS-level I/O in the CPU. These charge pumps are programmable in voltage and can be set to a large range of values. In this manner, a (0V, 3.3V) discrete can be transformed into a (−4V, +5V) signal, as an example. For inputs, an agile analog gain and offset scheme can be employed. In this case, the gain and offset coefficients are selected and implemented by DACs such that the output voltages are converted to the (0V, V.sub.dd) range.

The foregoing description details certain preferred embodiments of the present invention and describes the best mode contemplated. It will be appreciated, however) that the invention can be practiced in many ways and is not intended to be limited or restricted in any fashion except as defined in the claims which follow, and any equivalents thereto.

What is claimed is:

1. An instrument controller comprising:
   a non-volatile memory storage component for program and data storage;
   a large volatile memory storage component for additional program and data storage;
   a processor coupled to both the non-volatile memory storage component and the large volatile memory storage components, the processor capable of high-frequency and low-frequency operations and having an embedded memory for storing an initialization program that enables the processor to start up processing without first retrieving a program from the non-volatile memory;
   at least two internal oscillators coupled to the processor, for providing clock signals for the low-frequency and high-frequency operations;
   a plurality of gates arranged in a field programmable gate array, the gate array coupled to the processor and configured to run independent processes in parallel with the processor; and
   a plurality of analog-to-digital converters for receiving a plurality of analog inputs, digitizing the analog inputs at one of at least two possible bit depths, thereby generating digital inputs, and providing the digital inputs to the processor;
   wherein a first portion of the gates in the field programmable gate array is configured to perform signal processing; and
   wherein a second portion of the gates in the field programmable gate array is configured to operate as a signal distribution matrix for rerouting signals within the instrument controller.

2. The instrument controller according of claim 1, wherein a third portion of the gates in the field programmable gate array is configured to activate the instrument controller from a deactivated state, or to deactivate the instrument controller from an active state.

3. The instrument controller of claim 1, wherein the processor is configured to automatically activate from a totally deactivated (unpowered) state upon receiving an external activation signal, perform proscribed operations, and automatically return to a totally deactivated state using no power.

4. The instrument controller of claim 1, further comprising a plurality of analog outputs, each output being controlled by an independent digital-to-analog converter, each of the independent digital-to-analog converters being configured to convert from one of at least two possible bit depths to analog.

5. The instrument controller of claim 1, wherein a third portion of the gates in the field programmable gate array is configured to operate as an internal embedded power converter capable of receiving an input voltage level and generating each operating and reference voltage needed within the instrument controller.

6. An instrument controller comprising:
   a non-volatile memory storage component for program and data storage;
   a large volatile memory storage component for additional program and data storage;
   a processor coupled to both the non-volatile memory storage component and the large volatile memory storage components, the processor, capable of high-frequency and low-frequency operations and having an embedded memory for storing an initialization program that enables the processor to start up processing without first retrieving a program from the non-volatile memory;
   at least two internal oscillators coupled to the processor, for providing clock signals for the low-frequency and high-frequency operations;
   a plurality of gates arranged in a field programmable gate array, the gate array coupled to the processor and configured to run independent processes in parallel with the processor;
   a plurality of analog-to-digital converters receiving a plurality of analog inputs, digitizing the analog inputs at one of at least two possible bit depths, thereby generating digital inputs, and providing digita inputs to the processor; and a resettable digital real-time quartz controlled clock for accurate date and time stamping of data before it is stored in the non-volatile memory.

7. The instrument controller of claim 6, wherein the processor is configured to automatically activate from a totally deactivated (unpowered) state upon receiving an external activation signal, perform proscribed operations and automatically return to a totally deactivated state using no power.

8. The instrument controller of claim 6, further comprising a plurality of analog outputs, each output being controlled by an independent digital-to-analog converter, each of the independent digital-to-analog converts being configured to convert from one of at least two possible bit depths to analog.

9. The instrument controller of claim 6, wherein a portion of the gates in the field programmable gate array is configured to operate as an internal embedded power converter capable of receiving an input voltage level and generating each operating and reference voltage needed within the instrument controller.

10. An instrument controller comprising:

a non-volatile memory storage component for program and data storage;

a large volatile memory storage component for additional program and data storage;

a processor coupled to both the non-volatile memory storage component and the large volatile memory storage components, the processor capable of high-frequency and low-frequency operations and having an embedded memory for storing and initialization program that enables the processor to start processing without first retrieving a program from the non-volatile memory;

at least two internal oscillators coupled to the processor, for providing clock signal for the low-frequency and high-frequency operations;

a plurality of gates arranged in a field programmable gate array, the gate array coupled to the processor and configured to run independent processes in parallel with the processor; and a plurality of analog-to-digital converters for receiving a plurality of analog inputs, digitizing the analog inputs at one of at least two possible bit depths, thereby generating digital inputs, and providing the digital inputs to the processor;

wherein a portion of the gates in the field programmable gate array are configured to operate as an internal embedded power converter capable of receiving an input voltage level and generating each operating and reference voltage needed with the instrument controller.

11. The instrument controller of claim 10, further comprising a plurality of analog outputs, each output being controlled by an independent digital-to-analog converter, each of said independent digital-to-analog converter, being configured to convert from one of at least two possible depths to analog.

12. The instrument controller of claim 10, wherein the processor is configured to automatically activate from a totally deactivated (unpowered) state upon receiving an external activation signal, perform proscribed operations, and automatically return to a totally deactivated state using no power.

13. A method for conducting multiple parallel processing using a single instrument controller having a processor and a field programmable array, the method comprising:

receiving a plurality of analog inputs, digitizing the analog inputs at one of at least two possible bit depths (thereby generating digital inputs);

providing a first portion of the digital inputs to the processor;

providing a remaining portion of the digital inputs to the field programmable gate array;

performing digital signal processing on the first portion of the digital inputs utilizing the processor;

receiving the remaining portion of the digital inputs at the field programmable gate array and configuring a first portion of the field programmable gate array to perform digital signal processing on the remaining portion of the digital inputs, thereby conducing multiple parallel processing using a single instrument controller; and configuring a second portion of the gates in the field programmable gate array to operate as an internal embedded power converter capable of receiving an input voltage level and generating each operating and reference voltage needed within the instrument controller.

14. The method for conducting multiple parallel processing using a single instrument controller as in claim 13, further comprising the additional step of providing at least two internal oscillator signals to the processor for low-speed and high-speed digital signal processing operations.

15. A stand-alone instrument controller comprising:

a plurality of gates arranged in a field programmable gate array having multiple portions of gates, the multiple portions of gates including:
a first portion of the gates in the field programmable gate array is configured to perform signal processing,
a second potion of the gates in the field programmable gate array is configured to operate as a signal distribution matrix, and
a third portion of the gates in the field programmable gate array is configured to operate as an internal embedded power converter;

a microprocessor coupled to the plurality of gates, and configured to operate independently or under the control of the plurality of gates;

a non-volatile memory storage system with non-volatile storage components for programs and data storage coupled to both the microprocessor and the plurality of gates;

a large volatile memory storage system coupled to the microprocessor with volatile storage components having a memory size that is comparable to, or larger than, an address space operated upon by the microprocessor;

a plurality of analog-to-digital converters for receiving a plurality of analog inputs and digitizing the analog inputs, thereby providing digital inputs for use in the instrument controller; and a plurality of analog outputs where each analog output is controlled by an independent digital-to-analog converter, and each independent digital-to-analog converter is configured to convert from one of at least two possible depths to analog.

16. The stand-alone instrument controller of claim 15, further comprising a resettable digital real-time quartz controlled clock for accurate date and time stamping of data before it is stored in the non-volatile memory.

17. The stand-alone instrument controller of claim 15, wherein the internal embedded power converter is configured to receive an input voltage level and to generate each operating and reference voltage needed within the instrument controller.

18. The stand-alone instrument controller of claim 15, wherein the microprocessor is configured to automatically activate from a totally deactivated (unpowered) state upon receiving an external activation signal, perform proscribed operations, and automatically return to a totally deactivated state using no power.

19. The stand-alone instrument controller of claim 15, further comprising at least two internal oscillators coupled to the microprocessor for providing clock signals for low-frequency and high-frequency operations.

20. A method for conducting multiple parallel processing using a single instrument controller having a field programmable array, the method comprising:

configuring a portion of the gates in the field programmable gate array to operate as an internal embedded power converter capable of receiving at least one input voltage level and generating each operating and reference voltage needed for activation, operation, and deactivation of the instrument controller.

* * * * *

UNITED STATES PATENT AND TRADEMARK OFFICE
CERTIFICATE OF CORRECTION

PATENT NO. : 6,938,177 B1
DATED : August 30, 2005
INVENTOR(S) : Blemel

It is certified that error appears in the above-identified patent and that said Letters Patent is hereby corrected as shown below:

<u>Title page,</u>
Item [57], ABSTRACT,
Lines 2-3, "incorporate" should be -- incorporates --.

<u>Column 1,</u>
Line 7, "tis" should be -- this --.
Line 14, "multi-hip" should be -- multi-chip --.
Line 39, "output" should be -- outputs --.
Line 49, "bee" should be -- been --.

<u>Column 2,</u>
Line 5, "multilayer" should be -- multi-layer --.
Line 60, "feature" should be -- features --.

<u>Column 3,</u>
Line 41, "embodiment" should be -- embodied --.
Line 47, "input" should be -- inputs --.

<u>Column 5,</u>
Line 34, "converts" should be -- converters --.
Line 43, "sale" should be -- scale --.
Line 57, "a synchronous" should be -- asynchronous --.

<u>Column 6,</u>
Line 22, "nonvolatile" should be -- non-volatile --.
Lines 26 and 32, "preened" should be -- preferred --.
Line 48, "he" should be -- the --.

<u>Column 7,</u>
Line 17, "cryst" should be -- crystal --.
Line 33, "to" should be -- timing --.
Line 38, "intended" should be -- integrated --.

<u>Column 8,</u>
Line 2, "FGA" should be -- FPGA --.

<u>Column 9,</u>
Line 22, "digital" should be -- digitized --.
Line 32, after "to" delete "of".
Line 34, "microlight" should be -- micro-light --.

UNITED STATES PATENT AND TRADEMARK OFFICE
CERTIFICATE OF CORRECTION

PATENT NO. : 6,938,177 B1
DATED : August 30, 2005
INVENTOR(S) : Blemel

It is certified that error appears in the above-identified patent and that said Letters Patent is hereby corrected as shown below:

Column 11,
Line 1, "digita" should be -- digital --.

Column 12,
Line 16, after "portion of" insert -- the gates in --.
Line 18, "conducing" should be -- conducting --.
Line 37, "potion" should be -- portion --.

Signed and Sealed this

Twenty-fourth Day of January, 2006

JON W. DUDAS
*Director of the United States Patent and Trademark Office*